(12) United States Patent
Muiter et al.

(10) Patent No.: US 10,099,588 B2
(45) Date of Patent: Oct. 16, 2018

(54) REVERSIBLE WRITING SURFACE FOR SOFT ARMREST APPLICATIONS

(71) Applicant: Ford Global Technologies, LLC, Dearborn, MI (US)

(72) Inventors: James Hadley Muiter, Plymouth, MI (US); Christopher Jacob Lockwood, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/413,643

(22) Filed: Jan. 24, 2017

(65) Prior Publication Data
US 2018/0208088 A1 Jul. 26, 2018

(51) Int. Cl.
*B60N 2/75* (2018.01)
*B60N 3/00* (2006.01)

(52) U.S. Cl.
CPC .............. *B60N 2/79* (2018.02); *B60N 2/753* (2018.02); *B60N 3/001* (2013.01)

(58) Field of Classification Search
CPC ........ B60N 2/468; B60N 2/4673; B60N 2/46; B60N 2/4606
USPC ... 297/145, 149, 153, 188.16, 188.17, 411.2, 297/411.3, 411.26, 411.32, 411.35; 108/44, 45
See application file for complete search history.

(56) References Cited

U.S. PATENT DOCUMENTS

| | | | | |
|---|---|---|---|---|
| 2,524,909 A * | 10/1950 | Hines | ................... | B60N 2/4673 224/275 |
| 3,083,998 A * | 4/1963 | Morris | ................. | B60N 2/4673 297/188.19 |
| 3,260,541 A * | 7/1966 | Sadler | ................... | A01B 71/06 403/325 |
| 3,338,629 A * | 8/1967 | Drees | ..................... | B60N 3/002 224/275 |
| 3,497,076 A * | 2/1970 | O'Brien | .................. | A47B 1/05 211/1.3 |
| 4,809,897 A * | 3/1989 | Wright, Jr. | ............. | B60N 3/101 220/521 |
| 5,042,877 A * | 8/1991 | Yokota | ..................... | B60N 2/46 297/411.2 |
| 5,076,524 A * | 12/1991 | Reh | ........................ | B60N 2/468 248/296.1 |
| 5,087,096 A * | 2/1992 | Yamazaki | ................ | A47C 7/70 297/145 |
| 5,116,099 A * | 5/1992 | Kwasnik | ................ | A47C 7/543 16/360 |

(Continued)

*Primary Examiner* — Jose V Chen
(74) *Attorney, Agent, or Firm* — Vichit Chea; Brooks Kushman P.C.

(57) ABSTRACT

An armrest unit is disclosed that is selectively moveable between a first configuration, whereby the armrest is used as a traditional armrest, and a second configuration whereby the armrest is usable as a writing surface. The armrest unit comprises an armrest and a mounting pin. The armrest has a first section constructed of a compressible material and a second section connected to one side of the first section and constructed of a non-compressible material. The mounting pin engages a mounting channel in the armrest. The armrest is selectively rotatable about the mounting pin to move the armrest 180° between the first configuration and the second configuration. A method of operating the armrest unit is also disclosed.

21 Claims, 8 Drawing Sheets

(56) References Cited

U.S. PATENT DOCUMENTS

| | | | |
|---|---|---|---|
| 5,372,403 A | 12/1994 | Puerto | |
| 5,516,191 A * | 5/1996 | McKee | B60N 2/468 |
| | | | 297/145 |
| 5,671,686 A | 9/1997 | Hurley et al. | |
| 6,032,587 A | 3/2000 | Salenbauch et al. | |
| 6,929,304 B1 * | 8/2005 | Dry | A47C 7/72 |
| | | | 224/539 |
| 6,997,508 B2 * | 2/2006 | Jaaska, Sr. | B60N 2/4613 |
| | | | 297/188.14 |
| 7,520,552 B2 * | 4/2009 | Nakamura | B60R 7/04 |
| | | | 108/44 |
| 7,604,291 B2 * | 10/2009 | Vitito | B60R 11/0211 |
| | | | 296/37.8 |
| 8,668,258 B2 * | 3/2014 | Uwague-Igharo | B60N 2/4686 |
| | | | 224/275 |
| 8,813,657 B2 * | 8/2014 | Winter | B60N 2/4633 |
| | | | 108/44 |
| 8,944,390 B2 * | 2/2015 | Deerberg | A47B 37/00 |
| | | | 248/118 |
| 2006/0083582 A1 * | 4/2006 | Balsells | F16B 21/18 |
| | | | 403/325 |

\* cited by examiner

REVERSIBLE WRITING SURFACE FOR SOFT ARMREST APPLICATIONS

TECHNICAL FIELD

The present disclosure relates to selectively stowable hard writing surfaces included in a center console armrest of a vehicle.

BACKGROUND

There are many vehicle owners that use their vehicles as mobile offices. As such, at times it may become necessary to take notes or create other writings. However, when sitting in the vehicle, there is no readily available surface on which to write, except for an armrest in the vehicle console. However, the armrest is not designed as a writing surface. Instead, it is typically constructed of a soft, compressible material that is designed for comfort for either a passenger or vehicle driver's arm.

One option to provide a writing surface is for the vehicle occupant to bring a separate clipboard. While a clipboard would provide a writing surface, it may slide and or move along the armrest while in use, especially as the clipboard is longer than the width of the armrest and is likely to come into contact with the vehicle occupant. Moreover, the vehicle occupant must remember to bring the clipboard and find an accessible storage location within the vehicle when not in use.

While the soft, compressible material of the armrest may be replaced with a hard surface, such a construction would be undesirable as it would provide an uncomfortable surface for vehicle occupants when being used as an armrest. Accordingly, an armrest having a selectively stowable writing surface is needed.

SUMMARY

Arrangements of an armrest unit are disclosed that includes an armrest that is selectively moveable between a first configuration, whereby the armrest is used as a traditional armrest, and a second configuration whereby the armrest is usable as a writing surface. The armrest unit comprises an armrest and a mounting pin. The armrest has a first section constructed of a compressible material and a second section connected to one side of the first section and constructed of a non-compressible material. The mounting pin engages a mounting channel disposed in the armrest. The armrest is selectively rotatable about the mounting pin to move the armrest 180° between the first configuration and the second configuration.

In another exemplary arrangement, a vehicle console is disclosed. The vehicle console comprises a base member and an armrest unit. The armrest unit includes an armrest having a first section constructed of a compressible material and a second section overlaying one side of the first section and constructed of a non-compressible material, such as a hard writing surface. A mounting pin engages a mounting channel disposed in the armrest. The mounting pin is connected to a hinge and the hinge is connected to the base member, such that the armrest is selectively pivotable about the hinge with respect to the base member. The armrest is selectively rotatable about the mounting pin to move the armrest 180° between a first configuration and second configuration.

A method of selectively positioning an armrest into a writing configuration is also disclosed. One exemplary method begins by pivoting the armrest from a first configuration that exposes a compressible surface for a user, to a vertical position with respect to a base member of a vehicle console. Next, the armrest is lifted upwardly along an axis of a mounting pin positioned within the armrest to unlock the armrest, to allow for selective rotation. The armrest is then rotated 180°. Next the armrest is pushed downwardly along the axis of the mounting pin to relock the armrest against rotation. Finally, the armrest is pivoted with respect to the base member to position the armrest in a second configuration that exposes a non-compressible writing surface to a user.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
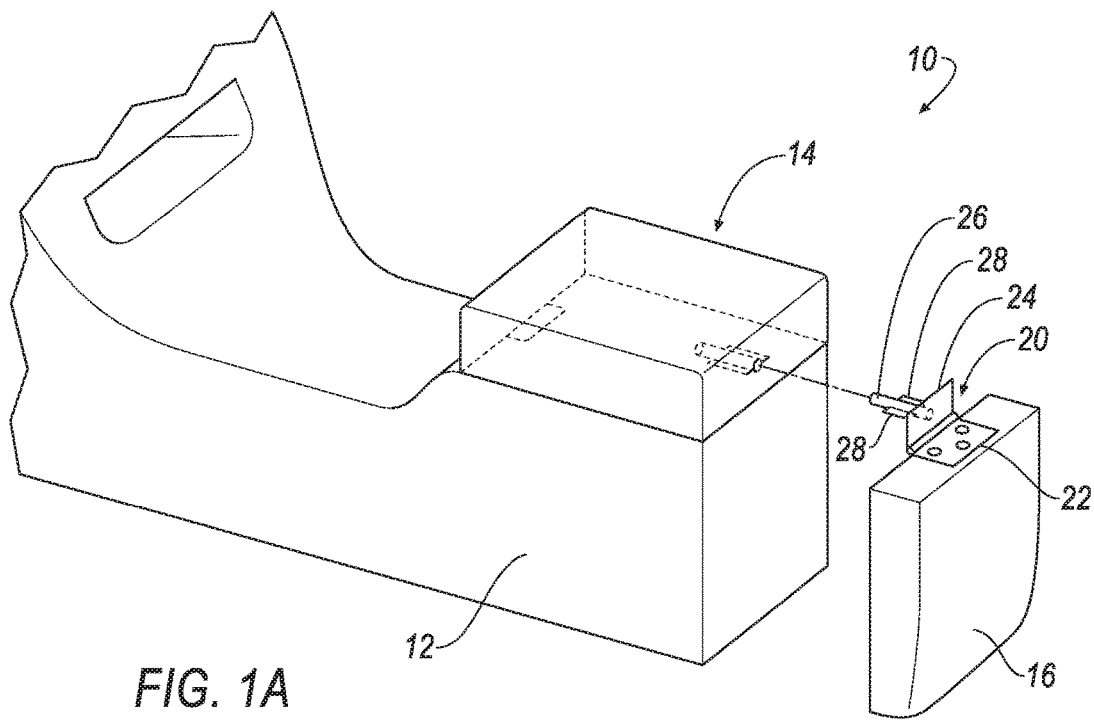
FIG. 1A illustrates a partially exploded perspective view of a vehicle console with an armrest having a selectively stowable hard writing surface.

Referring to FIG. 1A an exemplary arrangement of a vehicle console 10 is shown. The vehicle console 10 includes a base member 12 an armrest unit 14, and a rear panel 16. The base member 12 may be arranged between adjacent vehicles seats (not shown) and may include a storage compartment 18 (best seen in FIGS. 4-6) therein. The armrest unit 14 is connected to the base member 12 so as to selectively cover and close off the storage compartment 18.

Figure 1B:
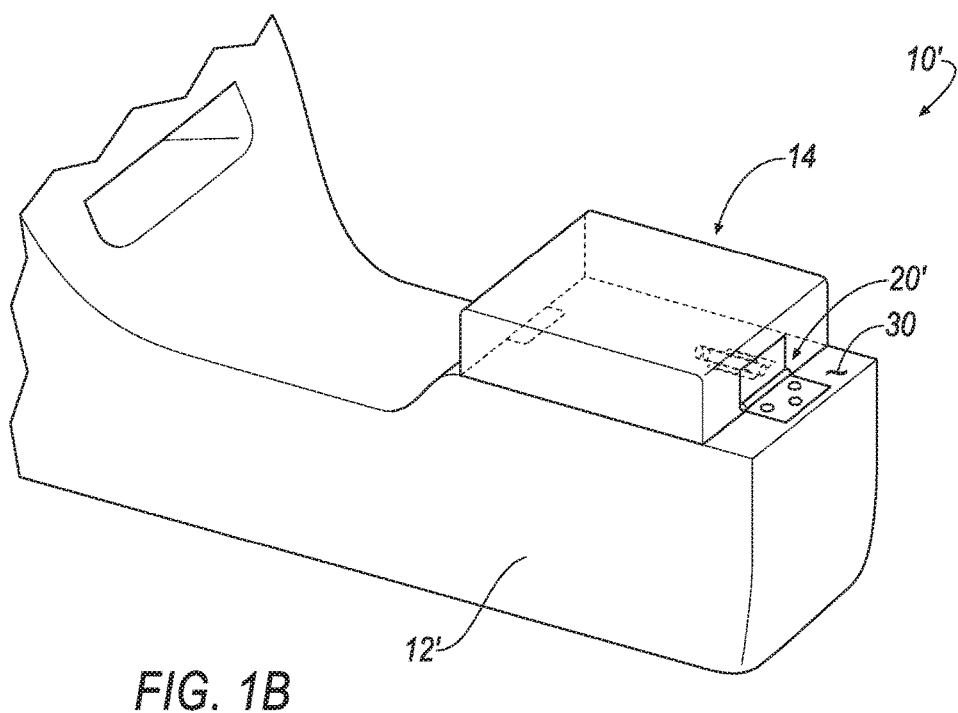
FIG. 1B illustrates a perspective view of an alternative arrangement of a vehicle console with an armrest having a selectively stowable hard writing surface.

The rear panel 16 fixedly attaches to the base member 12 in any conventional manner, such as by fasteners. Rear panel 16 also connects to the armrest unit 14 by a hinge 20. Hinge 20 includes one hinge plate 22 that is connected to the rear panel 16, as well as another hinge plate 24 that carries a mounting pin 26 that includes locking fins 28 mounted thereon. Alternatively, the rear panel 16 may be eliminated, as shown in FIG. 1B, with the hinge 20' being fixedly attached to a top surface 30 of the base member 12' of the vehicle console 10'.

Figure 2:
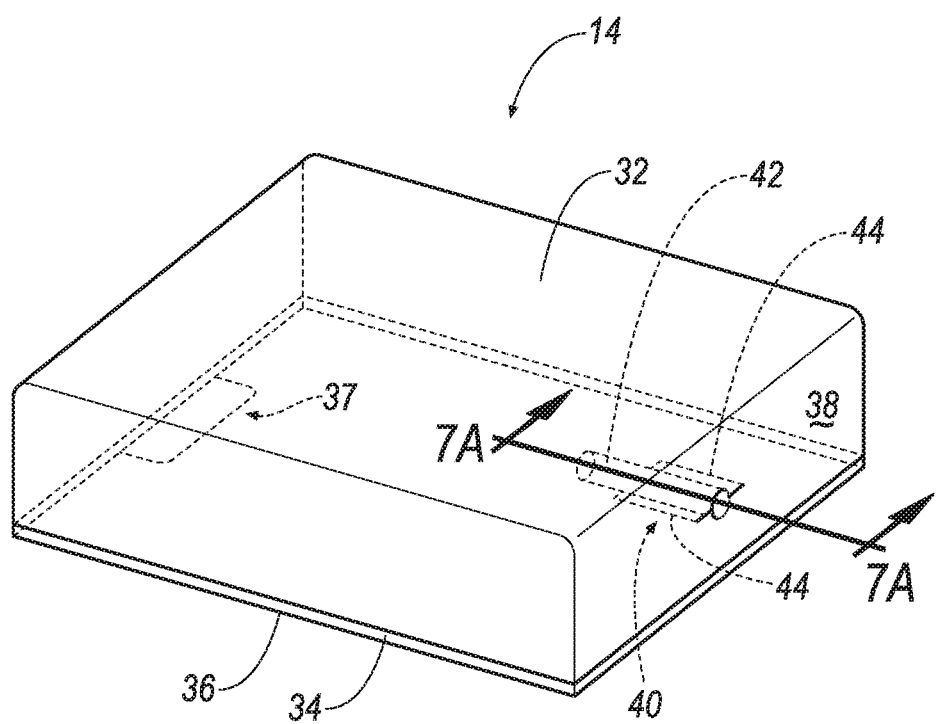
FIG. 2 is a perspective view of the armrest in a first position.
Figure 3:
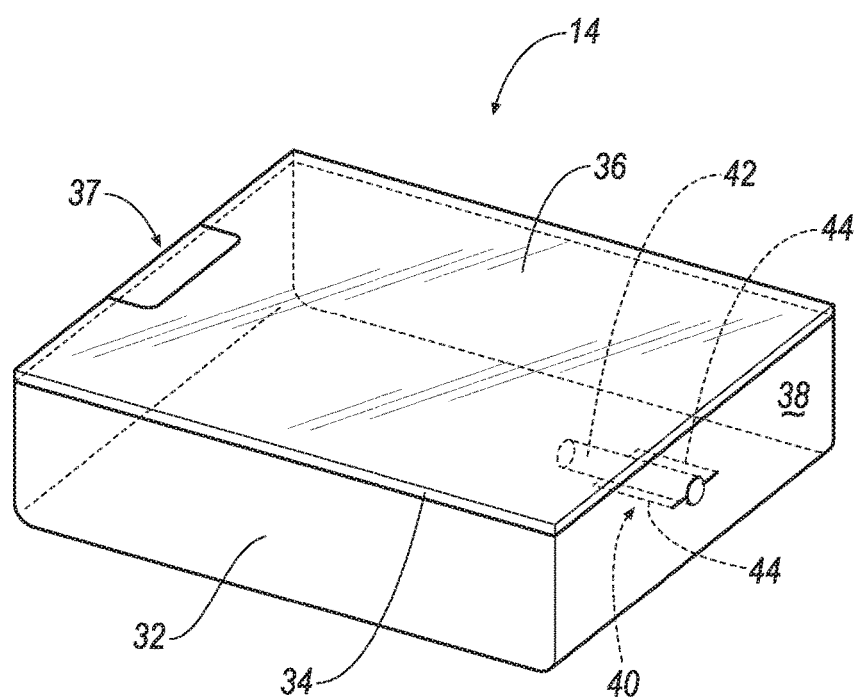
FIG. 3 is a perspective view of the armrest in a second position to expose a writing surface.

Armrest unit 14 is defined by an armrest and a mounting pin, each of which will be discussed in further detail below. Referring to FIGS. 2 and 3, the armrest is defined by a first section 32 and a second section 34. First section 32 may be constructed with a compressible material (such as foam) having a material covering, such as leather or fabric to allow for user comfort as an arm rests upon it. The second section 34 is connected to one surface of the first section 32. Second section 34 is constructed to be planar and having a hard outer surface 36. In one exemplary arrangement, the second section 34 overlays one surface of the first section 32, as shown in FIG. 3. However, the second section 34 may partially overlay the surface of the first section 32 or be partially inset within the first section 32. A latch mechanism 37 may be provided on at least one of the first and second sections 32, 34 to secure the armrest unit 14 to the base member 12 so as to cover the storage compartment 18.

As shown in FIG. 2, the armrest unit 14 is in a first configuration when the second section 34 is disposed against the base member 12 (i.e., facing the storage component) and the first section 32 faces away from the base member 12. In this configuration, the armrest unit 14 may be used as a traditional armrest. Referring to FIG. 3, the armrest unit 14 is rotated 180° into a second configuration. In the second configuration, the first section 32 is disposed against the base member 12 and the second section 34 faces away from the base member 12. In this configuration, the armrest unit 14 may be used as a writing surface.

Disposed within end surface 38 of first section 32 and extending therein is a mounting channel 40. Mounting channel 40 includes a central channel segment 42 and locking channel segments 44 disposed transverse to the central channel segment 42.

Figure 4:
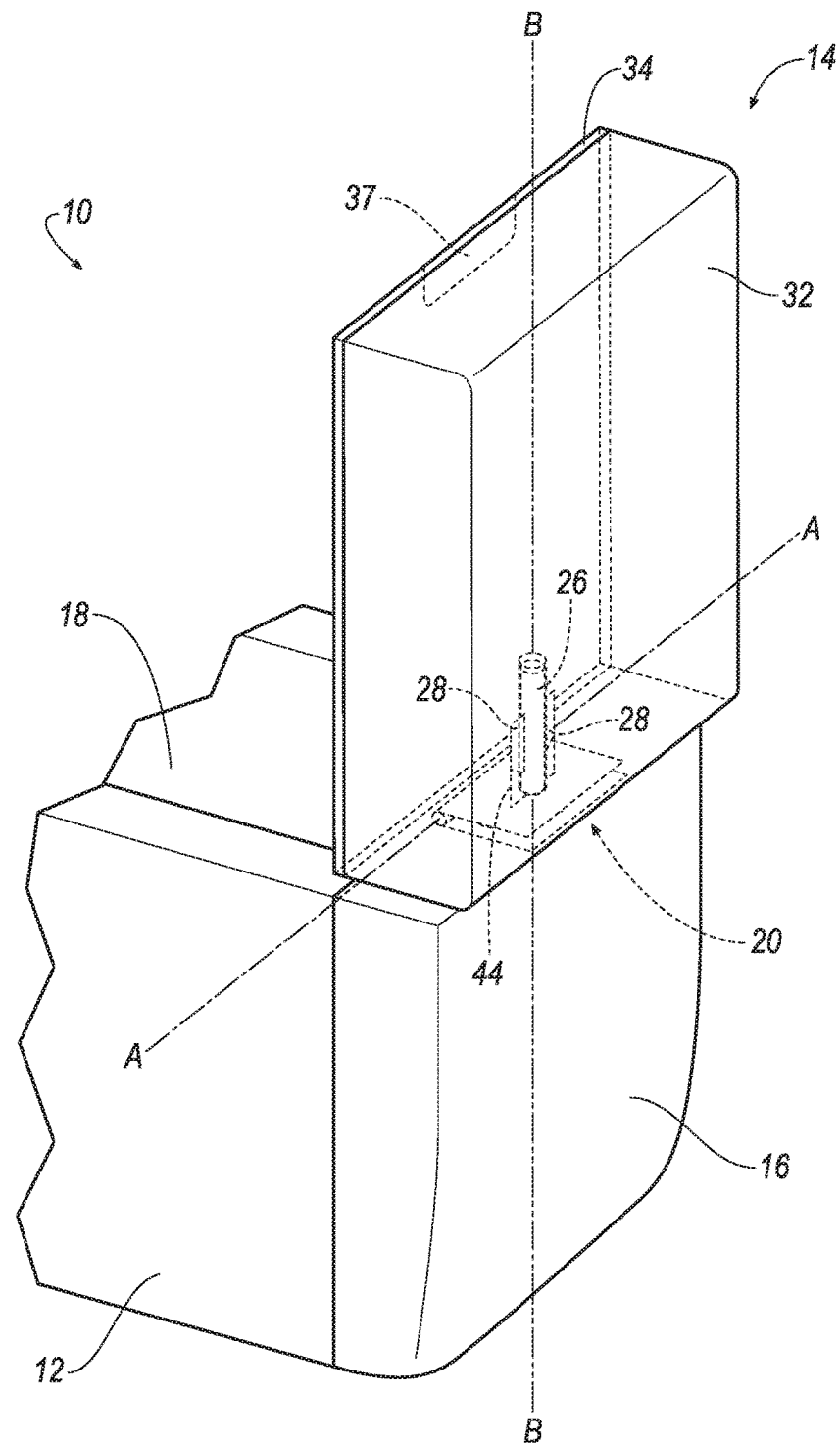
FIG. 4 is a perspective view of the armrest pivoted with respect to a base member of a vehicle console into an intermediate position as the armrest is being transitioned between the first and second positions.

Referring to FIG. 4, as discussed above in connection with FIG. 1A, the hinge plate 24 of the hinge 20 is not fixedly connected to the armrest unit 14. Rather, mounting pin 26, which is fixedly connected to the hinge plate 24, is inserted into the mounting channel 40. Locking fins 28, disposed on either side of the mounting pin 26, are received within the locking channel segments 44. With this arrangement, armrest unit 14 is pivotally connected to the base member 12 such that the armrest unit 14 is able to pivot about axis A-A with respect to the base member 12. However, the locking fins 28 cooperate with the locking channel segments 44 to prevent the armrest unit 14 from rotating about axis B-B while in the first, second and an intermediate position. More specifically, as shown in FIG. 4, the armrest unit 14 may be considered to be in the intermediate position when the armrest unit 14 is pivoted upwardly. With this arrangement, a user is able to access the storage compartment 18 in a traditional manner.

Figure 5:
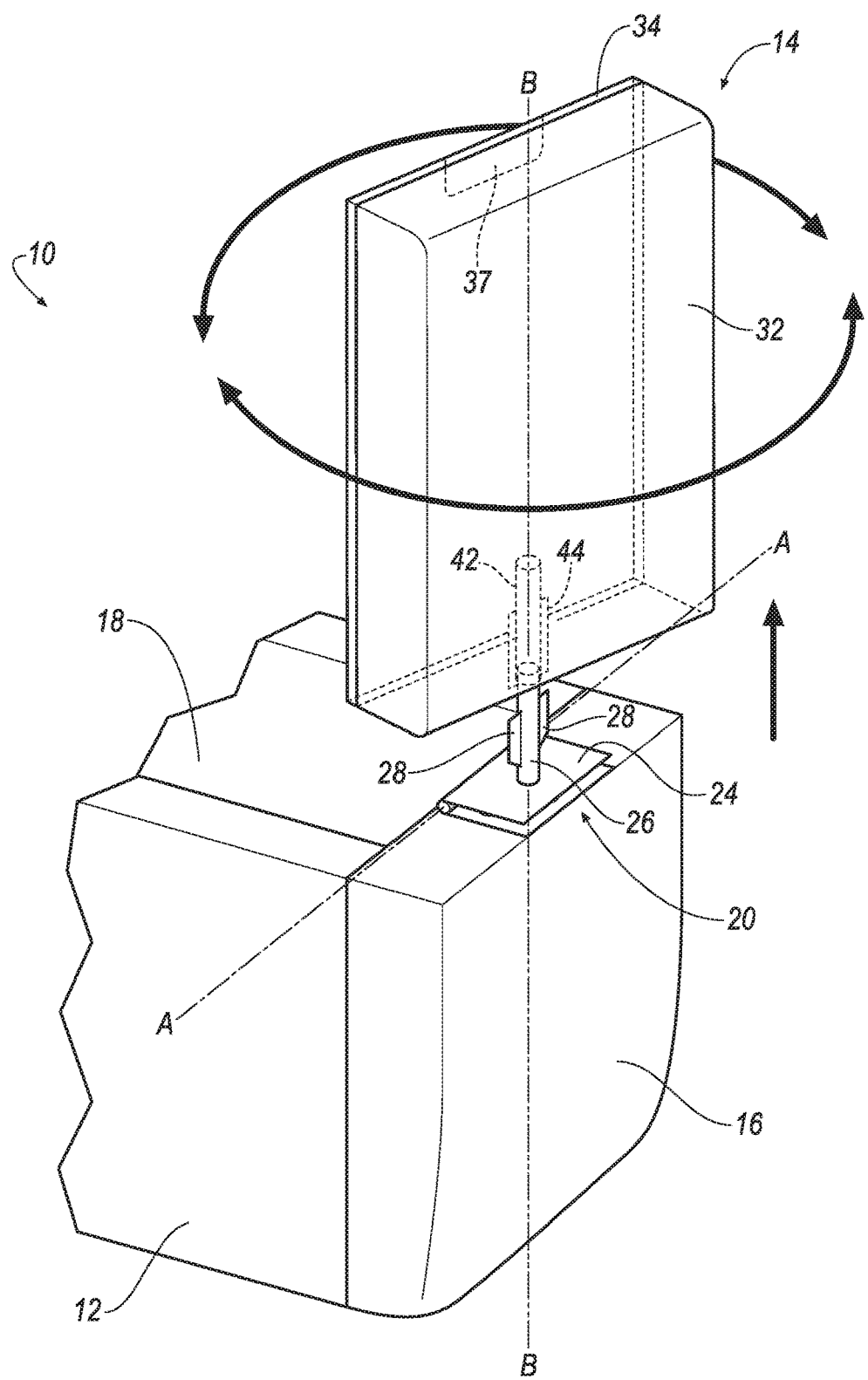
FIG. 5 is a perspective view of the armrest as the armrest is being lifted and rotated between the first and second positions.
Figure 6:
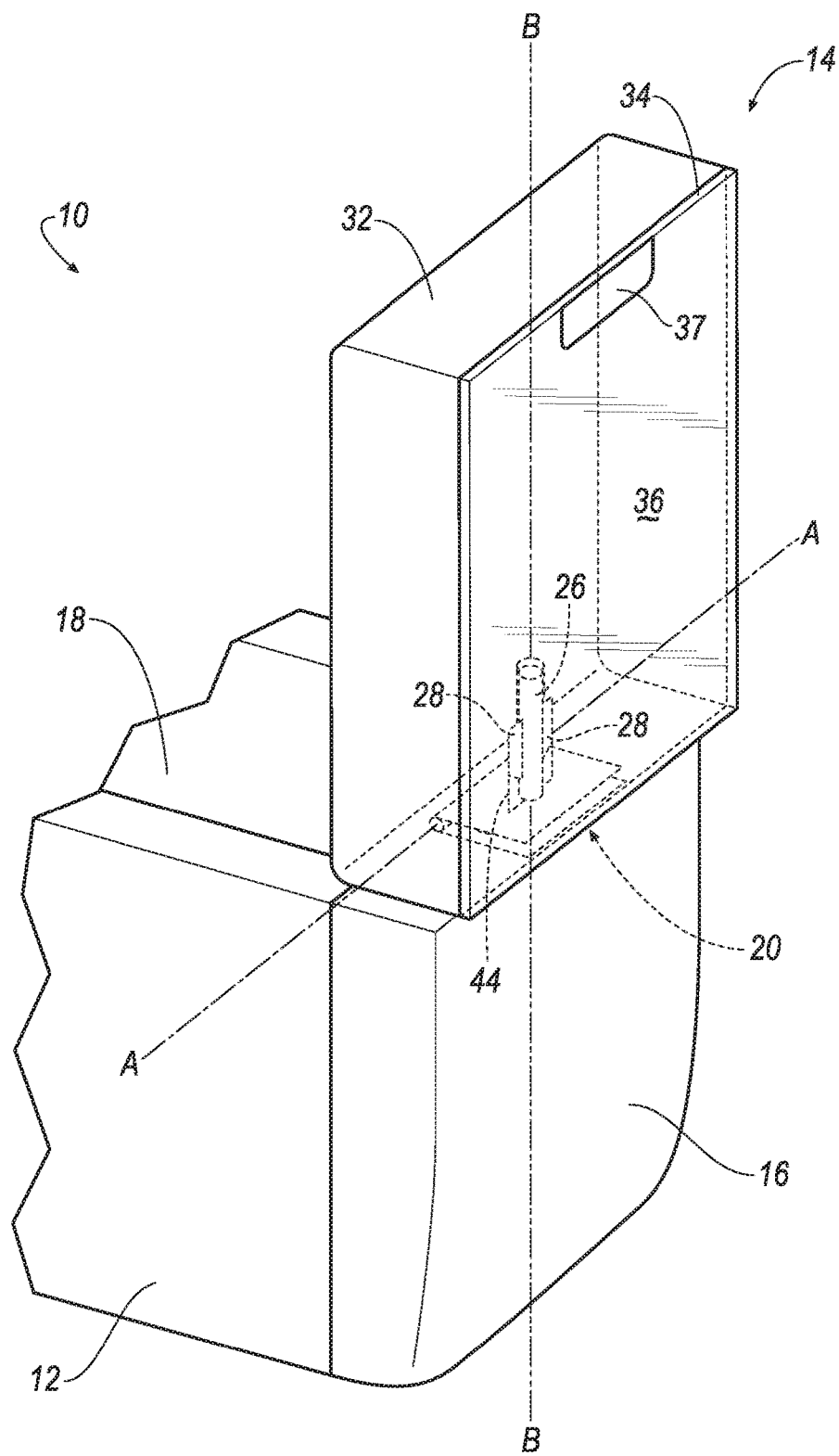
FIG. 6 is a perspective view of armrest in the intermediate position after the armrest has been oriented toward to the second position.

However, referring to FIG. 5, when a vehicle occupant wants a writing surface in the vehicle, the armrest unit 14 may be selectively actuated to rotate the armrest unit 14 into the second position (shown in FIG. 3), whereby the second section 34 is facing away from the base member 12. More specifically, once the armrest unit is pivoted into the intermediate position shown in FIG. 4, the armrest unit is then lifted upwardly away from the base, along axis B-B until the locking fins 28 clear the locking channels 44. In one exemplary arrangement, an end portion of the mounting pin 26 may remain within the mounting channel 42. With this arrangement, the armrest unit 14 is able to rotate about axis B-B to move the armrest unit 14 180°, as shown in FIG. 6. Once rotated, the armrest unit 14 is moved linearly downwardly such that the locking fins 28 reengage with the locking channels 44, thereby placing the locking fins 28 in a locking configuration. Once the armrest unit 14 is fully seated on the mounting pin 26, as shown on FIG. 6, the armrest unit 14 will once again resist rotation. The armrest unit 14 may then be pivoted downwardly about axis A-A and placed into the second position (shown in FIG. 3). Once in the second position, the armrest unit 14 may be used as a writing surface.

Figure 7A:
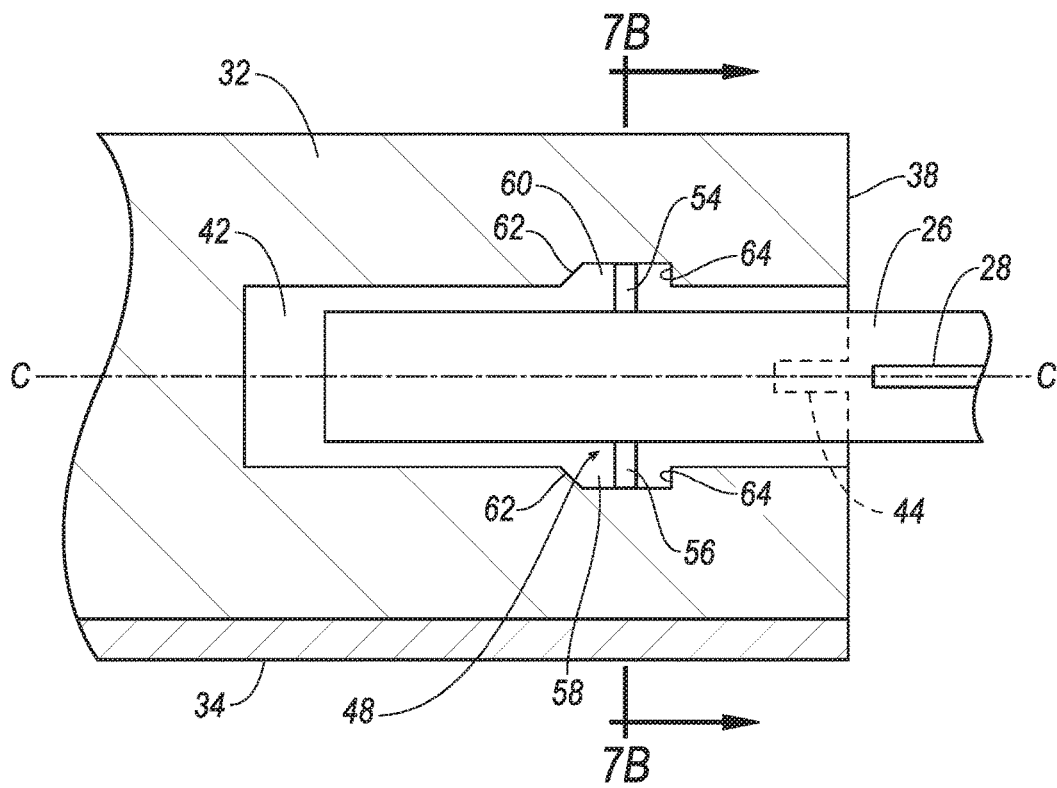
FIG. 7A is a cross-sectional view of a mounting channel taken along lines 7A-7A in FIG. 2.
Figure 7B:
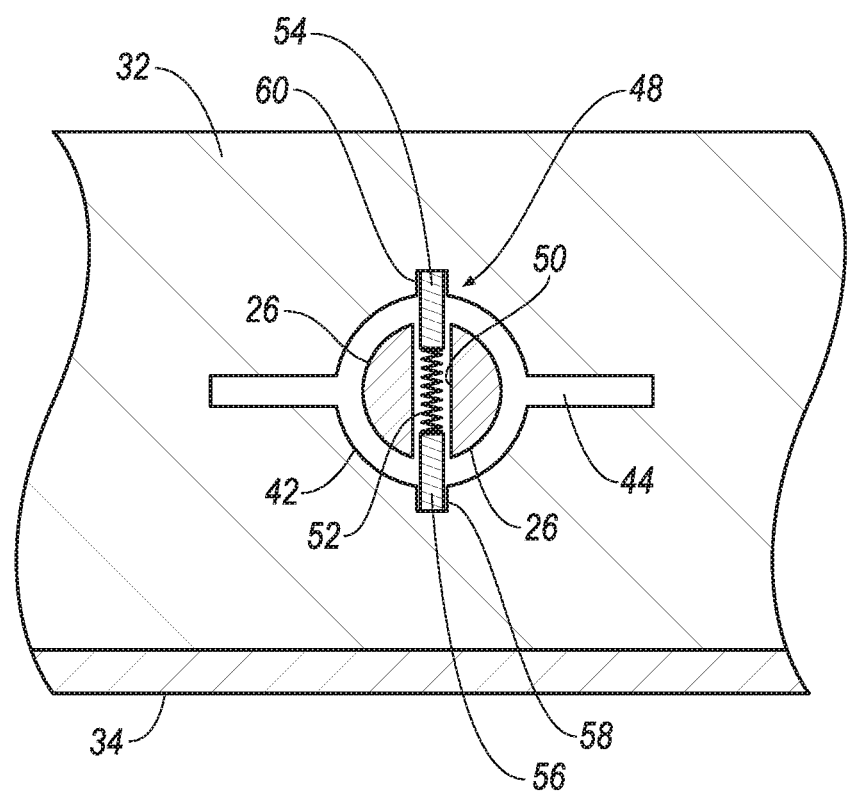
FIG. 7B is a cross-section view of the mounting channel of FIG. 7A, taken along lines 7B-7B in FIG. 7A.

To insure that the mounting pin 26 remains engaged with the mounting channel 42, after the armrest unit 14 is lifted upwardly from the base member 12, the mounting pin 26 may be provided with locking member 48. More specifically, as shown in FIGS. 7A and 7B, the mounting pin 26 is provided with a passage 50 therethrough. The passage 50 is arranged offset from the locking channel segment 44. In one exemplary arrangement, the passage 50 is arranged offset by 90°. The locking member 48 is disposed within the passage 50. In one exemplary arrangement, the locking member 48 is constructed as a spring biased lock pin and comprises first and second lock members 52, 54. The first and second lock members 54, 56 are biased away from one another to normally extend outwardly from the passage 50 by a spring 52.

The mounting channel 42 is further provided with lock grooves 58, 60. Lock grooves 58, 60 are sized to receive a portion of the first and second lock members 54, 56, respectively. The lock grooves 58, 60 each are partially constructed of a ramp 62. The ramps 62 of each of the lock grooves 58, 60 extend inwardly toward a central axis C-C of the mounting channel 42 on a side of the lock grooves 58, 60 that faces away from the end surface 38 of the armrest unit 14. The lock grooves 58, 60 are offset by 90° from the lock channels 44 such that the lock grooves 58, 60 are not collocated with the lock channels 44. Further, as shown in FIG. 7A, the lock grooves 58, 60 are axial spaced from the lock channels 44, away from the so as to be spaced further away from the end surface 38 than an end of the lock channels 44.

When the armrest unit 14 is first assembled to the base member 12, the mounting pin 26 is inserted into the mounting channel 42. The first and second lock members 54, 56 may be manually depressed toward each other and against the biasing force of the spring 56, to permit the mounting pin 26 to enter into the mounting channel 42. The first and second lock members 54, 56 will be forced outwardly once the locking member 48 reaches the lock grooves 58, 60, due to the biasing force of the spring 52. However, as mounting pin 26 is advanced within the mounting channel 42, the lock members 54, 56, will be forced against the spring 52, due to the ramps 62. The locking fins 28 will then engage with the lock grooves 58, 60 as the mounting pin 26 is fully seated within the mounting groove 42.

However, when the armrest unit 14 is moved upwardly to disengage the locking fins 28 from the locking channel segments 44, as shown in FIG. 5, to enable rotation of the armrest unit 14, the first and second lock members 54, 56 will re-engage with the lock grooves 58, 60, respectively. The lateral edge 64 of the lock grooves 58, 60, opposite the ramps 62, prevents the mounting pin 26 from being fully disengaged from the armrest unit 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An armrest unit, comprising:
an armrest having:
   a first section constructed of a compressible material; and
   a second section constructed of a non-compressible material connected to one side of the first section; and
a mounting pin engaging a mounting channel disposed in the first section;
wherein the armrest is selectively pivotable about an armrest end and rotatable about the mounting pin to move the armrest 180° between a first configuration and second configuration.

2. The armrest unit of claim 1, wherein the mounting pin is fixedly connected to a hinge plate.

3. The armrest unit of claim 2, wherein the mounting pin further includes locking fins mounted thereon, and wherein the locking fins are fully seated within the channel in a locking configuration such that the arm rest is prevented against rotation about the pin.

4. The armrest unit of claim 3, wherein the mounting channel further comprises a central channel segment and at least one locking channel segments disposed transverse to the central channel segment, wherein the pin includes a pair of locking fins that are-received within the locking channel segments when the armrest is in the locking configuration.

5. The armrest unit of claim 4, wherein the armrest is slidable along an axis of the mounting pin to frictionally disengage the locking fins from the armrest and permit rotation of the armrest about the axis of and end of the mounting pin.

6. The armrest unit of claim 4, wherein the mounting pin further comprises a locking member that frictionally engages the channel to prevent the mounting pin from being fully disengaged from the mounting channel.

7. The armrest unit of claim 6, wherein the locking member further comprises first and second lock members connected by a spring that biases the first and second lock members away from one another, and wherein the mounting pin further includes a passage that receives the locking member therein.

8. The armrest unit of claim 7, wherein the passage is offset from the locking channel segments.

9. The armrest unit of claim 8, wherein the passage is offset from the locking channel segments by 90°.

10. The armrest unit of claim 7, wherein the mounting channel is provided with a pair of lock grooves sized to receive a portion of the first and second lock members, respectively.

11. The armrest unit of claim 10, wherein each of the lock grooves contains a ramp that extends inwardly toward a central axis of the mounting channel on a first side of the lock grooves.

12. A vehicle console, comprising:
a base member; and
an armrest unit;
wherein the armrest unit includes:
   an armrest having a first section constructed of a compressible material; and
   a second section overlaying one side of the first section and constructed of a non-compressible material; and
   a mounting pin engaging a mounting channel disposed in the first section;
wherein the mounting pin is connected to a hinge, wherein the armrest is selectively pivotable about the hinge and rotatable about the mounting pin to move the armrest 180° between a first configuration and second configuration.

13. The vehicle console of claim 12, wherein the hinge includes first and second hinge plates, the first hinge plate connected to the base member, the mounting pin being fixedly connected to the second hinge plate, wherein the armrest is pivotable upwardly from a use configuration to an intermediate configuration with respect to the base member.

14. The vehicle console of claim 13, wherein the mounting channel further comprises a central channel segment and locking channel segments disposed transverse to the central channel segment, and wherein the mounting pin further comprises locking fins, the locking fins selectively engaging the locking channel segments to prevent the armrest from rotation when the locking fins are in a locking configuration.

15. The vehicle console of claim 14, wherein the armrest is slidable along an axis of the mounting pin to disengage the locking fins from the locking channel segments and permit rotation of the armrest about the mounting pin remaining within the channel locking and to move the armrest between first and second configurations.

16. The armrest unit of claim 12, wherein the mounting pin further comprises a locking member to prevent the mounting pin from being disengaged from the mounting channel, the locking member further comprises first and second lock members connected by a spring that biases the first and second lock members away from one another, and wherein the mounting pin further includes a passage that receives the locking member therein.

17. The armrest unit of claim 16, wherein the mounting channel is provided with a pair of lock grooves sized to receive a portion of the first and second lock members, respectively.

18. The armrest unit of claim 17, wherein each of the lock grooves contains a ramp that extends inwardly toward a central axis of the mounting channel on a first side of the lock grooves.

19. A method of selectively positioning an armrest into a writing configuration, comprising:
pivoting an armrest from a first configuration that exposes a compressible surface for a user, to a vertical position with respect to a base member of a vehicle console;
lifting the armrest upwardly along an axis of a mounting pin positioned within the armrest to unlock the armrest for selective rotation;
rotating the armrest 180°;
pushing the armrest downwardly along the axis of the mounting pin to lock the armrest against rotation; and
pivoting the armrest toward the base member to position the armrest in a second configuration that exposes a non-compressible writing surface to a user.

20. The method of claim 19, wherein lifting the armrest upwardly to unlock the armrest for selective rotation further comprises sliding the armrest past locking fins of the mounting pin such that the mounting fins are unseated from the mounting channel.

21. An armrest unit, comprising:
an armrest having:
   a first section constructed of a compressible material and having a channel; and
   a second section connected to the first section and constructed of a non-compressible material; and a pin having a locking fin selectively frictionally engaging the channel;

the armrest selectively rotatable about the pin when the locking fin is unseated from the channel to move the armrest 180° between a first configuration and second configuration.

* * * * *